Nov. 7, 1933.  S. F. STAFFORD  1,933,877
CONTROL DEVICE
Filed May 18, 1931  3 Sheets-Sheet 1
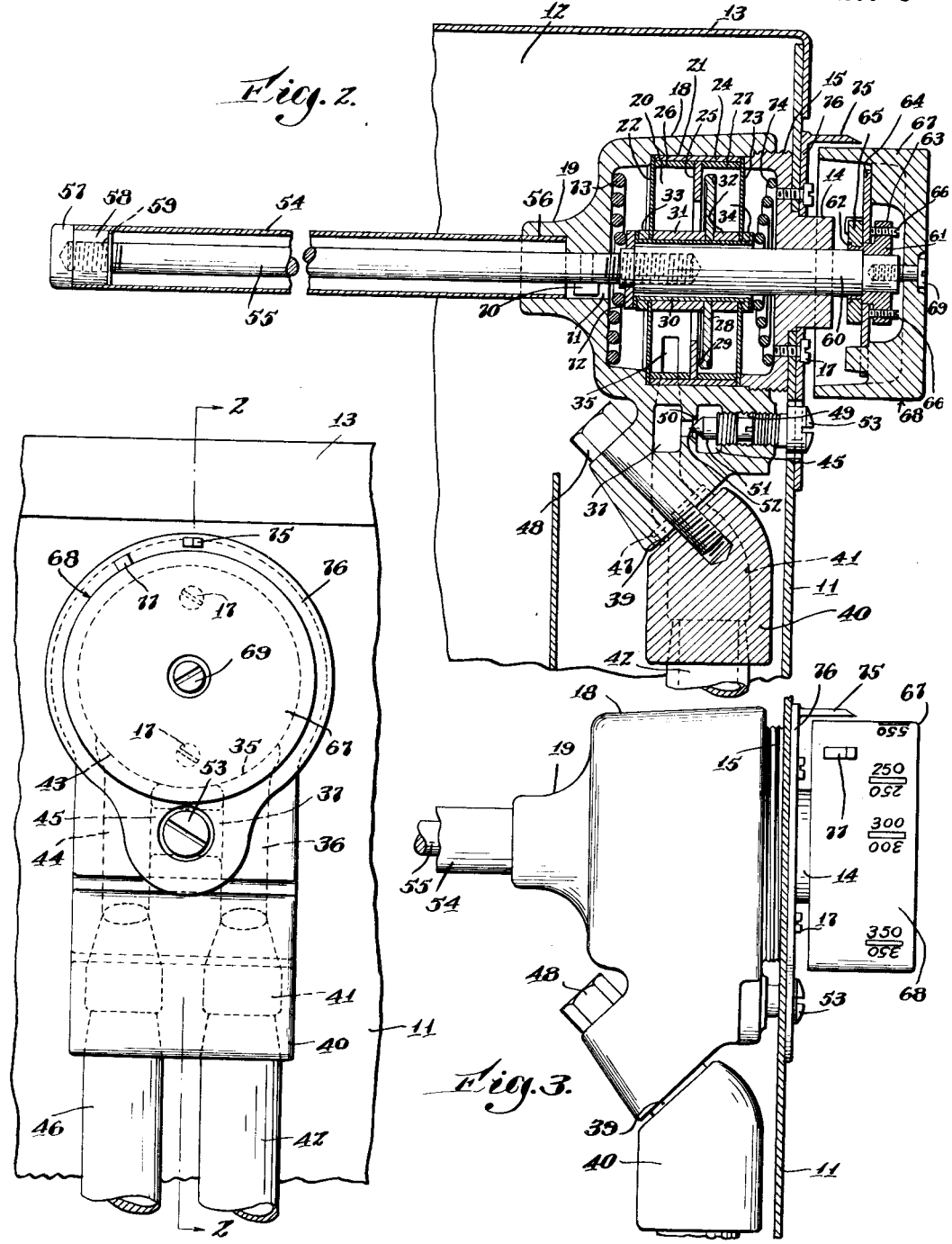

Nov. 7, 1933.  S. F. STAFFORD  1,933,877
CONTROL DEVICE
Filed May 18, 1931   3 Sheets-Sheet 2
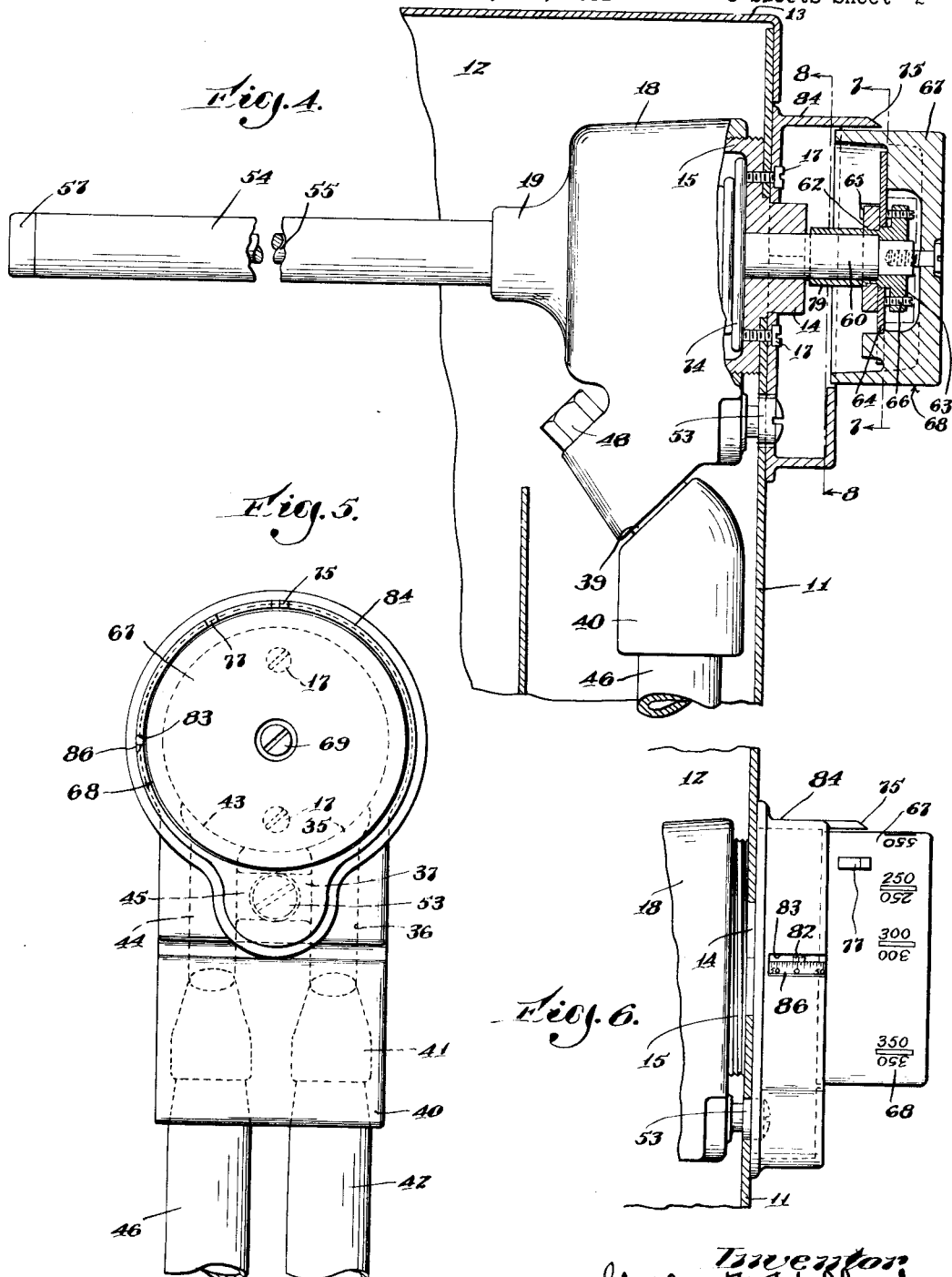

Nov. 7, 1933. S. F. STAFFORD 1,933,877
CONTROL DEVICE
Filed May 18, 1931 3 Sheets-Sheet 3
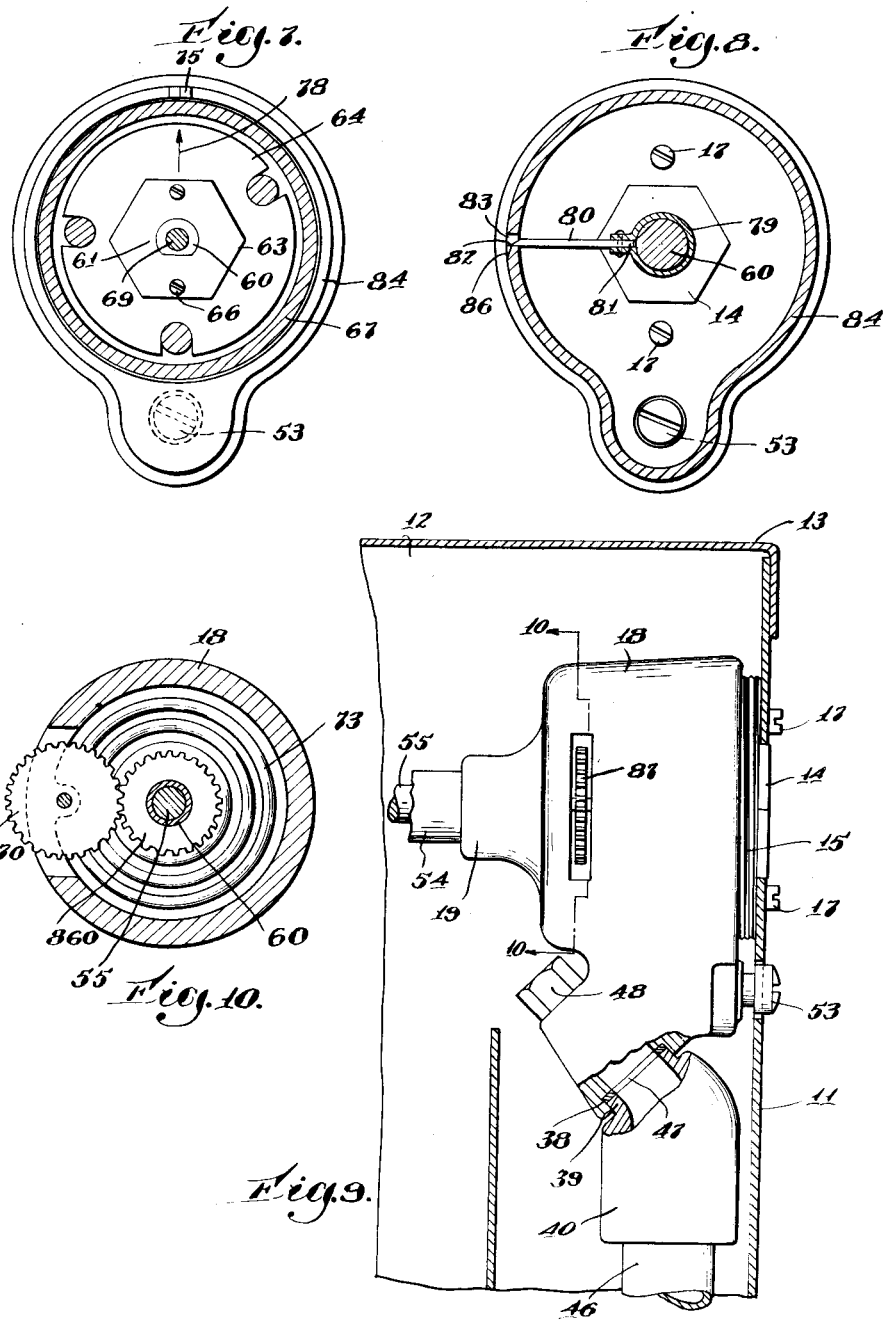

Patented Nov. 7, 1933

1,933,877

UNITED STATES PATENT OFFICE 1,933,877

CONTROL DEVICE

Stephen F. Stafford, Cambridge, Mass.

Application May 18, 1931. Serial No. 538,053

23 Claims. (Cl. 236—15)

The present invention relates to control devices having temperature-responsive means operable to control a heating element, and more particularly to devices which control the supply of fluid fuel, such as gas, to a burner or the like and which contain a control valve acted upon by a rod and tube thermostat through adjustable operating connections by which the valve may be set to be closed by the thermostat at selected temperatures to which the thermostat is exposed.

Heretofore the tube and the adjustable operating connections between the rod and the valve have been exposed to the gas, thus necessitating a packed joint between the rod and the tube and in between the operating dial and the adjustable connections. Packed or taper joints are objectionable as they wear rapidly and leak gas into the room or the oven. These joints create considerable resistances to the rotation of the dial which must be grasped firmly. This presents difficulties, particularly when the dial is hot.

The principal object of the present invention is to produce a control device in which the gas is confined to the region of the valve.

To the accomplishment of this object a feature of the invention contemplates the provision in a a gas control device having a housing, means for confining the gas to a definitely limited region therein, and a valve mounted within said region, of means exterior to said region for operating the valve.

With this construction the gas is confined to the region of the valve with the valve operating means outside the gas area. No gas seals of any kind are needed in the moving parts, thus cheapening the construction and rendering it easy to adjust manually.

Broadly considered, the gas may be confined to the region of the valve in any manner found desirable or expedient. I prefer to confine the gas in a chamber having a flexible hub and a rigid periphery, the valve being mounted on the hub and the valve seat being supported from the periphery. The flexible hub is moved to vary the position of the valve relatively to its seat by suitable connections interposed exterior to the gas chamber between the temperature-responsive means and the mechanism for adjusting the connections.

Other features of the invention reside in certain devices, combinations and arrangements of parts tending to improve and simplify the operation of control devices and enable them to operate with certainty. The advantages of these devices, combinations and arrangements of parts will be obvious from the following description, the inventions disclosed thereby being set forth broadly and in detail in the appended claims.

The various features of the present invention will be readily understood from an inspection of the accompanying drawings illustrating the best forms of the invention at present devised, in which, Figure 1 is a view in front elevation of the control device;

Fig. 2 is a view in sectional elevation on the line 2—2, Fig. 1;

Fig. 3 is a detail view in elevation;

Fig. 4 is a detail view in elevation, partly in section, of a modification;

Fig. 5 is a front elevation of the control device illustrated in Fig. 4;

Fig. 6 is a detail view in elevation thereof;

Fig. 7 is a view in sectional elevation on the line 7—7, Fig. 4;

Fig. 8 is a view in sectional elevation on the line 8—8, Fig. 4;

Fig. 9 is a detail view in elevation, partly in section, of a remote control device, and Fig. 10 is a view in sectional elevation on the line 10—10, Fig. 9.

In the illustrated embodiments of the invention the control device is supported from the outer wall 11 of the oven 12 in a gas range (not shown) adjacent the top 13 thereof. Projecting through a circular opening in the outer wall 11 is the hexagonal hub 14 of a cup shaped member 15 secured to the outer wall 11 inside the oven 12 by the screws 17. Threaded upon the cup shaped member 15 is a housing 18 having a hub 19 directed away from the wall 11.

The housing 18 houses a gas chamber 20. To this end the interior wall of the housing 18 is provided with a recess 21 which receives two annular flexible end disks 22 and 23, the end disk 23 abutting the end face of the member 15. Interposed between the disks and received in the recess 21 is a tube 24. Mounted vertically within the tube 24 is an annular disk 25 which is held in place between two tubes 26 and 27, fitted within the tube 24 and engaged with the end disks 22 and 23, respectively. The right-hand face, viewing Fig. 2, of the disk 25 forms a valve seat for an annular valve 28 having a peripheral flange 29 cooperating with the valve seat. The valve 28 is supported by a central tube 30 which fits tightly the central opening in the annular end disks 22 and 23. The valve 28 is held in position on the central tube 30 by tubes 31 and 32 fitting the tube 30 and engaged, respectively, with the end disks 22 and 23. Adjacent its opposite ends the central tube 30 carries washers 33 and 34 engaged with the outside faces of the disks 22 and 23, respectively. The opposite ends of the tube 30 are flared outwardly to cause them to press the adjacent washers tightly against the adjacent disks.

This construction provides a tightly closed chamber in which the gas is confined to a definitely limited portion of the control device. The valve and its seat are mounted, within the gas chamber, from the flexible hub and the rigid periphery, respectively. With this construction the valve is free to be moved towards and away from its seat under pressure exerted upon the opposite ends of the tube 30.

By limiting the gas in the control device to a definite portion thereof only the parts defining or within said portion need be constructed of material resistant to the corrosive action of the gas. These parts are either tubes or stampings, providing a simple, cheap and effective construction.

The gas is conducted into the gas chamber 20, through an opening 35 (Fig. 2) formed in the tubes 24 and 26 from a vertical cored passage 36, in the housing 18, provided with a blind lateral extension 37 (Figs. 1 and 2). On its bottom the housing 18 is provided with a flat face formed on an angle of 45 degrees with respect to the outer wall 11. This face, adjacent the inlet to the passage 36, is provided with a recess 38 (Fig. 9) which receives a cylindrical projection 39 on the upper face of an adapter 40. The adapter 40 is provided with a cored passage 41 which conducts the gas from a vertical pipe 42, threaded into the bottom face of the adapter, through the cylindrical projection 39 and into the passage 36.

The gas which flows into the gas chamber 20 may pass through the central opening in the disk 25 and out beyond the periphery of the valve 28 when the flange 29 thereof is unseated from the disk 25. The gas is conducted out of the gas chamber 20, through an opening 43 (Fig. 1) in the tubes 24 and 27, into a cored passage 44, in the housing 18, provided with a blind lateral extension 45 (Figs. 1 and 2). From the passage 44 the gas flows through a cylindrical projection on the adapter 40 similar to the projection 39. The adapter 40 is also provided with a cored passage for conducting the gas to the vertical pipe 46 which conducts the gas to the range burner. Each of the recesses 38 in the bottom of the housing 18 is provided with a washer 47 (Fig. 9). The housing 18 is secured to the adapter 40 by a bolt 48 having a head engaged with the housing 18 and a shank threaded into the adapter.

The construction which permits a substantially straight line flow of gas into and out of the housing 18 reduces the friction of the gas conducted by the pipes 42 and 46 to a minimum so that the difference between the pressures therein is due substantially solely to the pressure drop at the valve 28. Confining the pressure drop to the valve renders it sensitive so that extremely small movements thereof will instantly affect the amount of gas supplied to the oven burner. If the passages conducting the gas into and out of the chamber 20 were tortuous the pressure drop would not be confined to the valve thus creating conditions varying with the amount of gas flowing through the valve at different oven temperatures. In consequence there would be a tendency for the valve to close at a temperature different from the valve closing temperature intended by the user of the range.

In order to provide for a by-pass around the valve 28 to maintain a minimum flame, a passage 49 (Fig. 2) is formed in the housing 18 in such a manner that an opening is cut through the wall 50 separating the adjacent blind lateral extensions 37 and 45. The passage 49 is formed by drilling a single hole into the casing 18, the point of the drill, after passing through the blind lateral extension 45, breaching the wall 50. The hole made by the drill in the casing 18 is tapped to receive a by-pass valve 51 having a tapered end arranged to engage, if desired, a frusto-conical brass seat 52 driven into the entrance to the hole in the wall 50. The by-pass valve 51 is protected from tampering by a screw 53 having a head projecting through the wall 11 and a shank threaded into the passage 49. With this construction the by-pass passage is formed by a single drilling and a single tapping operation. The use of plugs for plugging extra drill holes is thus obviated.

The position of the valve 28 with relation to its seat is controlled by a thermostat, herein shown as a copper tube 54, and an invar rod 55. One end of the tube 54 abuts the bottom of a recess 56 formed in the hub 19. The other end of the tube 54 engages loosely a shoulder formed on a cap 57. This cap is provided with a shank 58, received within the free end of the tube and with a threaded recess 59, which receives the threaded end of the rod 55.

The other end of the rod 55 is threaded into a recess formed on one end of a shaft 60 extended freely through the tube 30 and journaled in the hub 14. At its other end the shaft 60 is provided with a portion of reduced diameter to which is splined a collar 61 (Figs. 2, 4 and 7). The collar 61 is provided with a cylindrical portion 62 and a hexagonal portion 63 which engage, respectively, the shaft and the reduced portion thereof. The collar 61 loosely supports a thin metal disk 64 (Figs. 2, 4 and 7) having one face engaged by a nut 65 which is riveted to the portion 62 by flaring outwardly on the end face thereof. The disk 64 is clamped to the nut 65 by two screws 66 mounted in the portion 63.

As shown in Figs. 2, 4 and 7 the disk 64 provides a three-point suspension for a porcelain or cast iron dial 67 having a scale 68 on its periphery. Preferably, the laterally projecting lugs on the dial 67 and the peripheral slots in the disk 64 are so arranged relatively that the dial may be placed in one fixed position only relatively to the disk. This arrangement may be conveniently secured by spacing the slots and the lugs unevenly upon the disk and the dial, respectively. The dial 67 is secured to the end of the shaft 60 by a screw 69 which also holds the collar 61 in position against the shoulder between the shaft 60 and its reduced end portion. The three-point suspension of the dial on the thin metal disk 64 tends to keep the dial cool. With this construction rotation of the dial 67 rotates the shaft 60. As the rod 55 is prevented from rotation by a key or spline 70, mounted to slide in a slot 71 formed in the hub 19 adjacent the recess 56, rotation of the shaft 60 causes it to move longitudinally with relation to the rod 55.

Secured to a shoulder on the end of the shaft 60 opposite the dial is a disk or collar 72 one face of which engages one end of the central tube 30 of the gas chamber 20. The other face of the disk 72 is engaged by the smaller base of a frusto-conically coiled spring 73, the larger base of which engages the housing 18. The opposite end of the tube 30 of the gas chamber is engaged by the small base of a frusto-conically coiled spring 74, the large base of which engages the cup shaped member 15.

The spring 73 is heavier than the spring 74. This construction has an important effect upon the wear of the threads connecting the rod 55 and the shaft 60. The pressure of the heavy spring 73 tends to prevent back lash in the threads. But as the heavy pressure of the spring 73 is partially counter-balanced by the spring 74 the back lash preventing pressure is light, thus insuring long wear of the threads and a smooth and easy rotative movement of the shaft 60.

The differential pressure of the springs 73 and 74 also maintains the cap 57 engaged with the free end of the tube 54 under a constant tension notwithstanding the expansion and contraction of the tube. When the heat from the range burner raises the temperature in the over 12 the tube 54 expands, thus moving to the left (Fig. 2) as a unit the rod 55, the shaft 60, and the dial 67. During this movement of the shaft 60 the disk 72 stores power in the spring 73, and the spring 74 is thus permitted to move the tube 30 to the left relative to the external periphery of the gas chamber until the flange 29 on the valve 28 engages the valve seat, thereby shutting off the flow of gas through the valve. Thereafter the tube 54 contracts allowing the stored power in the spring 73 to push the disk 72 to the right (Fig. 2) and open the valve.

With this construction the valve is closed by a light spring and opened by a heavy spring. The tube 54 performs work only during its expansion. That is, it stores power in the spring 73 during its expansion and this stored power is utilized to open the valve so that the tube 54 is not subjected to stresses during its contraction.

As the tube does not exert a push during its contraction it does not have to be attached to the casing 18 at one end nor to the cap 57 at its other end. As the tube 54 is used merely to determine the position of the cap 57 with relation to the valve at different temperatures no threading nor riveting operations on the tube are required. Not only is there no threaded cap at the outer end of the tube to invite tampering, but there is no gas within the tube to escape into the oven. Because it is not necessary to thread or otherwise machine the tube 54, a tube may be employed having an extremely thin wall, too thin, in effect, to thread practically. This permits a satisfactory reduction in the cost of the tube and makes the tube more responsive to variations in temperature as the lighter the tube is the more rapidly will it absorb and radiate heat.

By confining the gas to the gas chamber 20 the use of any form of a gas seal for the dial shaft 60 is obviated. This construction permits the shaft 60 to be supported quite loosely in the hub 14, providing a smooth and easy movement for the shaft in making adjustments.

As indicated in Fig. 3 the dial is provided with a scale 68 running from 250 to 550 degrees, thus indicating that the temperature range of the control device is 300 degrees. Cooperating with the scale 68 on the dial 67 is a pointer 75 projecting laterally from a plate 76 secured by the screws 17 to the wall 11. The periphery of the dial 67 is provided with a stop 77 which engages the sides of the pointer 75 and limits the movements of the dial to a single rotation forwardly or backwardly.

If the user of the range is desirous of having the valve 28 closed when the oven temperature reaches 300 degrees, for instance, the dial 67 is rotated to register the 300 mark on the scale 68 with the pointer 75. This rotation of the dial rotates the shaft 60 and thus causes the disk 72 to move the valve from its seat a distance such that when the tube 54 expands under 300 degrees of heat it will move the disk 72 to the left (Fig. 2) thus permitting the spring 74 to move the valve back into engagement with its seat and shut off the flow of gas therethrough.

In the practical use of control devices of the general type described herein it is necessary to provide for a cold check. That is, during the assembly of the gas range containing the control device it is necessary for the workman to adjust the device to impart correct temperature readings without requiring him to bring the oven to any particular temperature and then compare thermometer readings with dial settings. For this cold check it is customary to adjust the valve manually until it closes at room temperature. With the valve in the closed position, as indicated by the size of the gas flame due to gas flowing through the by-pass, the dial is set at such a temperature reading, found by mathematical or empirical methods, that will bring the correct closing of the valve when the dial is set to other temperature readings within the temperature range. It is highly desirable that the means provided for maintaining this final adjustment of the dial be such that no accidental displacements will occur, and, further, that the possibility of unauthorized persons attempting to alter the final adjustment be prevented.

In the illustrated embodiment of the present invention the disk 64 is provided with an arrow 78 (Fig. 7). With the dial 67 removed from the disk 64 the shaft 60 is rotated until the flame is reduced to a point indicating that the valve 28 has closed. Then the screws 66 are loosened permitting the rotation of the disk 64 relatively to the shaft 60 to register the arrow 78 with the pointer 75. The screws 66 are then tightened. As the screws 66 are parallel with the shaft 60 the desired adjustment is not disturbed during the screw tightening operation. The shaft 60, collar 61 and disk 64 may now be rotated as a unit for a portion of a revolution in a direction to move the valve 28 to the right (Fig. 2) a distance sufficient to set the valve to close when the oven has reached some temperature between 250 and 550 degrees. This will bring the unevenly spaced slots in the disk 64 into such relation with the pointer 75 that when the dial is replaced and the screw 69 tightened the movement of the dial will be limited to a single revolution by the stop 77 which will be on the proper side of the pointer 75 to cause the available setting to be the selected range, herein shown as 300 degrees. As the dial 67 may be supported on the disk 64 in only one fixed position relatively thereto, the relative angular position of the scale 68, the stop 77, the arrow 78 and the parts rotatable with the shaft 60 are such that the valve will close when the oven reaches a temperature corresponding to the setting on the dial in alignment with the pointer 75.

With this construction the screws 66 are concealed by the dial so that they are unlikely to be tampered with. As the scale is integral with the dial, and as the three-point suspension of the dial on the disk prevents their relative rotation, no slippage between the scale and the dial or the dial and the disk can possibly occur, thus insuring the correctness of the temperature readings on the scale.

In the practical use of gas ranges provided with control devices it has been customary heretofore to employ the condition of the gas flame as an index of the oven heat. When it is desired to bake at a predetermined temperature the gas is turned on full at the gas-cock and lighted, the dial is rotated to set the control to the desired temperature and then the user waits for the oven to preheat before putting in the food to be baked. The proper time to put in the food is determined by the change in length of the gas flame from a long to a short flame. This requires that the door be opened and the flame inspected a number of times. Moreover, there may be occasioned, after searing meat, for instance, to wait for the oven to cool down from a high to a lower heat. In this case the flame is inspected for an increase in length.

To obviate the necessity for the inspection of the flame under any condition of use, the shaft 60 (Fig. 4) is extended in length so that an elongated collar 79 may be clamped frictionally about its periphery in the space between the end of the hub 14 and the collar 61. Pivoted to the collar 79 is a lever 80 (Fig. 8) having a short arm 81 engaged with the adjacent face of the hub 14. The long arm of the lever 80 terminates in a pointer 82 which extends into a slot 83 formed in a hood 84 secured to the wall 11 by the screws 17 in a manner to cover the head of the screw 53. This hood 84 carries the pointer 75 extending over the scale 68. As shown in Fig. 6 the pointer 82 rides over a scale 85 on a surface 86 (Fig. 8) formed on the hood 84 below the slot 82. The scale is provided with a central or zero marking from which divisions extend on both sides thereof corresponding to relative temperatures both above and below the dial indications.

When the valve is moved to the closed position the hub 14 has turned the short arm 81 of the lever so that the pointer 82 thereof is brought to rest at zero. When the oven is to be used for baking at a dial setting of 400 degrees, for instance, and the oven reaches a temperature of 300 degrees the pointer 82 begins to move across the scale showing at all points between 300 and 400 degrees how rapidly the oven is coming up to the desired heat and also the exact time at which to place the food in the oven. The desired 400 degrees of heat in the oven is indicated when the pointer 82 comes to rest at zero.

If the dial is set at 500 degrees and the pointer has come to rest at zero and if then the setting is changed to a lower reading, 300 degrees, for instance, the pointer 82 will be swung to the other side of the zero and will then move to indicate the drop in oven temperature from 500 to 300 degrees returning to zero when the oven temperature reaches 300 degrees. Thus the pointer 82 serves as an oven thermometer indicating, within certain limits, temperatures above and below the dial indication.

In order to provide a convenient mechanism for the remote control of the adjustment by which the shaft 60 is rotated a gear 860 (Fig. 10) may be substituted for the fixed collar 72 on the shaft 60. The gear 860 is engaged by a gear 870, rotatably mounted on the housing 18, and driven by some suitable train (not shown).

While the control device illustrated and described herein is especially adapted for use on gas ranges for controlling the flow of gas to the oven burner to maintain predetermined temperatures in the oven, it will be understood by those skilled in the art that the features of the present invention are not limited to that particular use and that changes may be made in the details of structure, the described and illustrated embodiments thereof being intended as exploitations of the underlying essentials of the invention, the features thereof are definitely stated in their true scope in the claims herewith.

What is claimed as new, is:

1. In a gas control device, the combination with a housing, means for confining the gas to a definitely limited region thereof, and a valve mounted within said region, of means exterior to said region but extending axially thereof for operating the valve.

2. In a gas control device, the combination with a housing, a gas chamber therein, and a valve and a seat therefor mounted within the gas chamber, of means exterior to the gas chamber but extending axially thereof for relatively moving the valve and its seat.

3. In a gas control device, the combination with a housing, a gas chamber therein provided with a rigid periphery and a flexible hub and a valve and a seat therefor, one of which is mounted on the periphery and the other one of which is mounted on the hub, of means exterior to the gas chamber for flexing the hub to move the valve and its seat relatively.

4. In a gas control device, the combination with a housing, a gas chamber therein provided with a rigid periphery and a hollow flexible hub, and a valve and a seat therefor, one of which is mounted on the periphery and the other one of which is mounted on the hub, of means exterior to the gas chamber for flexing the hub to move the valve and the seat relatively including a shaft extending loosely within the hub.

5. In a gas control device, the combination with a housing, a gas chamber therein provided with a rigid periphery and a flexible hub, a valve supported by the hub and a seat supported from the periphery, of means exterior to the gas chamber for flexing the hub to move the valve towards and away from its seat.

6. In a gas control device, the combination with a housing, a gas chamber therein provided with a rigid periphery and a flexible hub, a valve supported by the hub and a seat supported from the periphery, of means for subjecting the opposite ends of the gas chamber exterior to different pressures.

7. A gas control device having, in combination, a housing, a gas chamber therein provided with a rigid periphery and a flexible hub, a valve supported by the hub and a seat supported from the periphery, a spring engaged with one end of the hub tending to flex the hub to move the valve towards its seat, a rod and tube thermostat, said rod being held from rotation, a shaft adjustably connected to the rod, an abutment carried by the shaft and engaged with the other end of the hub and a heavy spring engaged with the abutment tending to flex the hub to move the valve away from its seat.

8. A gas control device having, in combination, a housing, a gas chamber therein provided with a rigid periphery and a flexible hub, a valve supported by the hub and a seat supported from the periphery, a spring engaged with one end of the hub tending to flex the hub to move the valve towards its seat, a rod and tube thermostat, said rod being held from rotation, a shaft adjustably connected to the rod, an abutment carried by the shaft and engaged with the other end of the hub and a heavy spring engaged with the abutment tending to flex the hub to move the valve away from its seat and means for rotating the shaft to vary the relative positions of the abutment and the valve seat.

9. In a control device, the combination with temperature responsive means including a part movable as the temperature varies, a gas chamber, and a valve having a common axis with said part, within said chamber, of a transmitting element independent of said valve and exterior to the gas chamber consisting of two relatively rigid members one of which is operatively connected to the valve and the other one of which is adjustably connected to the movable part.

10. In a control device, the combination with a valve, a tube having a cap loosely engaged with one end, an abutment for the other end of the tube and a rod threaded at one end to the cap, of a transmitting element between the valve and the rod adjustably connected thereto.

11. In a control device, the combination with a valve, a tube having a cap loosely engaged with one end, an abutment for the other end of the tube and a rod threaded at one end to the cap, of a transmitting element between the valve and the rod having a threaded recess to receive the threaded other end of the rod.

12. In a control device, the combination with temperature-responsive means including a part movable as the temperature varies, a gas chamber, and a valve, having a common axis with said part, within said chamber, of a transmitting element independent of said valve and exterior to the gas chamber consisting of two relatively rigid members one of which is operatively connected to the valve and the other one of which is adjustably connected to the movable part, means engaging the movable part for preventing rotation thereof and means for rotating the second member to vary the position of the valve.

13. In a gas control device, the combination with a valve and a seat therefor and means for confining the gas to a definitely limited area in which the valve and its seat are located, of means entirely outside the gas area but extending axially thereof for relatively moving the valve and its seat.

14. In a control device, the combination with a thermostat, comprising a rod and a tube unthreaded at both ends, of a cap secured to the rod and engaged loosely with the outer end of the tube.

15. In a control device, the combination with a thermostat, comprising a rod and a tube having walls too thin to thread, and a fixed abutment for one end of the tube, of a movable abutment for the other end of the tube comprising a cap engaged loosely with the tube and secured to the rod.

16. A control device having, in combination, a shaft, a dial for rotating the shaft, a collar splined to the shaft, a disk angularly adjustable on the collar supporting the dial, and means for securing the disk in adjusted position on the collar.

17. In a control device, the combination with a valve and a temperature responsive means including a part movable along the axis of the valve as the temperature varies, and a scale, of a pointer operatively connected to the part and moving bodily therewith to cooperate with the scale for indicating changing temperature.

18. In a control device, the combination with temperature-responsive means including a splined part movable as the temperature varies, a valve, a transmitting element, independent of the valve and connected to the part, means for rotating the transmitting element to adjust it longitudinally, and a scale, of a pointer operatively connected to the part and movable bodily therewith to cooperate with the scale for indicating changing temperature.

19. In a gas control device, the combination with an oven or heating chamber, a housing, a gas chamber therein provided with a valve, and inlet and outlet passages carried by said housing leading to said gas chamber, of means within the oven or heating chamber including an adapter connected to the housing for conducting gas into and out of the gas chamber, said adapter having passages axially parallel with said housing passages and registering, respectively, therewith to provide a substantially straight line flow of gas through the adapter to the valve for confining the pressure drop solely to the gas flowing through the valve.

20. In a gas control device, the combination with a housing, a gas chamber therein provided with a rigid periphery and a flexible hub and a valve and a seat therefor, one of which is supported from the periphery and the other one of which is mounted on the hub, of means for moving the flexible hub to vary the relative positions of the valve and its seat.

21. In a gas control device, the combination with a housing, a gas chamber therein provided with a rigid periphery and a flexible hub and a valve and a seat therefor, one of which is supported from the periphery and the other one of which is mounted on the hub, of means for moving the flexible hub to vary the relative positions of the valve and its seat comprising temperature-responsive means and adjustable connections operated thereby.

22. In a gas control device, the combination with a housing, a gas chamber therein provided with a rigid periphery and a flexible hub and a valve and a seat therefor, one of which is supported from the periphery and the other one of which is mounted on the hub, of means for moving the flexible hub to vary the relative positions of the valve and its seat comprising temperature-responsive means, adjustable connections operated thereby, and means for adjusting the connections.

23. A control device having, in combination, a shaft, a dial for rotating the shaft and provided with a peripheral scale, a fixed pointer overhanging the scale, and means interposed between the dial and the shaft for supporting the dial comprising a disk provided with an arrow registering with the pointer for determining the proper position of the scale relatively to the shaft.

STEPHEN F. STAFFORD.